Dec. 22, 1936.  A. G. ROBINSON  2,065,096
MULTIPLE JOINT PNEUMATIC LIFTING JACK
Filed March 7, 1936
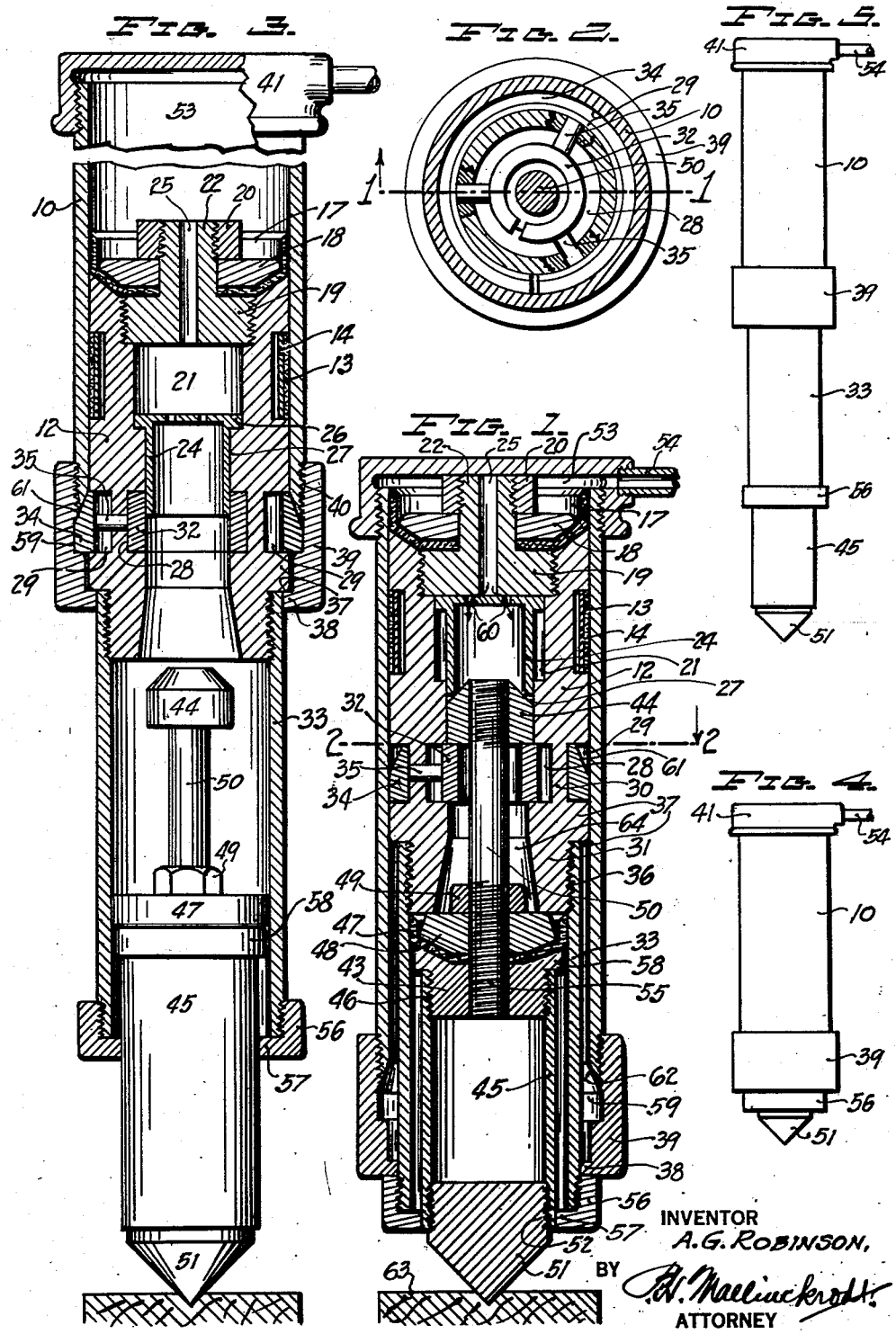

Patented Dec. 22, 1936

2,065,096

UNITED STATES PATENT OFFICE 2,065,096

MULTIPLE JOINT PNEUMATIC LIFTING JACK

Abbott G. Robinson, Pioche, Nev.

Application March 7, 1936, Serial No. 67,601

12 Claims. (Cl. 254—93)

This invention relates to a multiple joint pneumatic jack for lifting and supporting weights or structures of various kinds.

The principal objects of this invention are:

First. To provide a jack composed of two or more joints telescoping one into another, and so disposed that the ratio of the height of the jack extended to the height of the jack collapsed, is greater than has heretofore been attainable.

Second. To have maximum rigidity, especially when extended.

Pneumatic lifting jacks which are extensible due to the admission of compressed air or other fluid are well known and in common use, but jacks of that type as heretofore constructed, are definitely limited in their lifting travel. I have observed this is largely due to desire to keep the height of the collapsed jack as small as possible, while at the same time, it has heretofore not been practicable to use more than two telescoping joints. In my improved jack I overcome the difficulty by making the use of three or more telescoping joints practicable.

According to the invention, the jack begins extending when air or other fluid under pressure, is admitted to a chamber enclosed by the first joint, the force exerted by the compressed fluid being effective upon a piston attached to the second joint to push the same out of the first joint to the required extent. When pushed to its limit of travel, the piston of the second joint is automatically locked in place, and as the compressed fluid continues to flow into a chamber enclosed by the second joint, it becomes effective to push the third joint out of the second, and if the jack comprises more than three joints, to automatically lock the piston of the third joint in place when its extremity of travel is reached, and so on.

The invention is fully and clearly illustrated in the accompanying drawing, in which:

Fig. 1 represents a longitudinal center section taken on the line 1—1 in Fig. 2, of a jack composed of three joints, the jack being fully collapsed;

Fig. 2, a cross-section taken on the line 2—2 in Fig. 1;

Fig. 3, a longitudinal center section similar to Fig. 1, but showing the jack largely extended, and some of the parts in elevation instead of in section;

Fig. 4, an elevation of the jack fully collapsed, drawn to a reduced scale; and

Fig. 5, an elevation of the jack fully extended.

Referring to the drawing, the numeral 10 indicates the shell of the first or upper joint of the jack, within which is a longitudinally movable piston 12. At the upper end of the piston is a cup-leather 17, secured for example, between a follower disk 18 and a plug 19, by means of a nut 20 threaded on the stem 22 of the plug. The plug may be secured in the piston body in any suitable way, for example, by threading, and its purpose is to permit the insertion of an inverted cup 24 within a concentric recess or bore 21 in the piston body. The cup 24 may have a circular flange 26 which rides up and down in the recess 21, while the cup itself rides up and down through the bore 27, for a purpose which will presently be described. Just below the bore 27 is an inner annular recess 28 and an outer annular recess 29, these two recesses being separated by an annular wall 30 which connects the lower portion 31 of the piston body to the upper portion thereof.

In the inner annular recess is disposed an expansible ring 32, and in the outer annular recess, an expansible ring 34. A plurality in this instance, three, cylindrical pins 35, are slidably disposed in holes extending through the wall 30, so that certain expansive or contractive movements of the rings 32 and 34 may be mutually communicated to each other. The contracted positions of the rings 32 and 34 are shown in Fig. 1, and the expanded positions in Fig. 3.

At its lower end, the piston body is threaded at 36 to engage the interior threads at the upper end of the shell, of a second joint 33. When the piston is at the lower limit of its travel, an abutment portion 37 thereof, bears against the stop flange 38 of a sleeve 39, which latter is attached to the tubular shell 10 in any suitable way, for example, by threading at 40. The upper travel of the piston is stopped when the stem 22 and nut 20 strike a cap 41, which latter may be screwed on the tubular shell 10.

Slidably disposed within the tubular shell 33 of the second joint, is a piston composed of a head 43 secured in a third tubular shell 45 by threading at 46, or by any other suitable means. A piston rod 50 may be attached to the piston head 43 by threading at 55, and a cup-leather 47 may be secured between the piston head and a follower disk 48, by means of a nut 49. The upper end of piston rod 50 may be threaded to receive a pilot knob 44, on whose conical top rides the aforementioned inverted cup 24. In the collapsed jack, the pilot knob is engaged by the upper face of the contracted ring 32, as indicated in Fig. 1, and is thus locked in position. At the lower end of the tubular shell 45, is a plug forming a sharply pointed foot 51, secured in the shell 45, for instance, by threading at 52. The purpose of this pointed foot is to dig into the surface of a support, such as the timber 63, so as to secure a footing for the jack.

In operation, supposing the jack to be collapsed as indicated in Figs. 1 and 4, where the foot rests on a proper support with the body to be lifted (not shown), resting on the cap 41, compressed air from any convenient source, controlled by a valve as usual (not shown), is admitted through the pipe 54 into the chamber 53. This forces the first joint up from the piston 12.

If the conditions of service permit the full travel of the first joint, the stop 38 strikes against the abutment 37. Just before this position is reached, the tension of the rings 32 and 34 causes them to push out, and when the final position of the stop is reached, the rings will be in the fully expanded position indicated in Fig. 3, where the outer ring 34 occupies the annular space 59, and the inner ring, the entire annular space 28. The full expansion of inner ring 32 releases its interlock with pilot knob 44 and renders piston 12 free to travel upward past pilot knob 44. This further travel is accomplished by the admission of more compressed air through pipe 54.

Compressed air flows through passage 25, and squeezes its way through between plug 19 and inverted cup 24 (Fig. 1), passes through the holes 60 and further squeezes its way down into the chamber 64, at which time it reacts between the composite piston attached to the lower end of rod 50 and the cap 41, and forces the first and second joints up as a unit. Upward travel continues until the jack reaches any desired position, such as the one indicated in Fig. 1, or the final one indicated in Fig. 5 where an annular flange 57 on a collar 56, provides a stop for the annular flange 58. Thereafter, the jack supports the load.

The inverted cup 24 is rather loosely disposed in the bore 27, and so remains in contact with the beveled upper face of pilot knob 44 while piston 12 moves past it, until its flange 26 seats itself on the annular abutment at the bottom of recess 21, at which time the lower portion of the inverted cup is inserted in the inner ring 32 for the purpose of holding it in the expanded position.

When it is desired to collapse the jack, the air is exhausted through the pipe 54 by means of the aforementioned control valve. This allows the first and second joints as a locked unit, to descend by gravity until the pilot knob 44 is pushed up through the ring 32 and into contact with the cup 24, and is brought to a stop against the plug 19.

As soon as the pilot knob has passed the ring 32, the latter is contracted, due to the pressure exerted by the weight of the structure and its load, acting between the conical bore 62 and the beveled face 61, thus forcing the two expansible rings 32 and 34 back into the original positions of these parts shown in Fig. 1. As the exhausting of the air continues, the first joint drops back into the position shown in Figs. 1 and 4.

Although the body 12 is herein referred to as a piston, it does not act purely as a piston, but rather, it functions as a floating piston because air can find its way down into the body 12 until its progress is sealed off by the piston proper composed of the head 43 and its appurtenant parts.

The body 12 functions as a piston proper so long as the lower part of its bore is sealed, this being indicated in Fig. 1. Once the bore is unsealed, as for example, by the release of knob 44, the body 12 becomes a floating piston.

An expansion ring 14, preferably made of thin spring metal faced with leather 13, or other suitable material, is provided as a check against too free movement between the first and second joints.

The locking mechanism of this invention shown between the upper and second joints, can obviously be used with a jack composed of only two joints, since it acts as such until the second joint reaches the end of its extension travel relative to the first joint.

As a modification, the inverted cup or follower 24 can be omitted, although the rigidity of the fastening between the first and second joints is then impaired, owing to the removal of the resistance offered by the core formed by the follower cup 24, when the ring 32 is expanded.

Having fully described my invention, what I claim is:

1. A multiple joint pneumatic jack, including in combination, a joint section, another joint section telescoping thereinto, a third joint section telescoping into the second, mutually interlocking means automatically operative to hold the two first sections in positive relation to each other when the second joint section is fully extended relative the first joint section, other means automatically operative to hold the second and third joints mutually interlocked with each other when the jack is fully contracted, and means for introducing compressed fluid operatively into the jack.

2. A multiple joint pneumatic jack, including in combination, three joint sections operative to telescope one into another, and so disposed that when compressed air is introduced into the first joint section, the second section is forced out of the first section and automatically interlocked therewith when fully extended, and after the first two sections are interlocked, the third section is forced out of the second section.

3. A multiple joint pneumatic jack, including in combination, three joint sections disposed in telescoping relation to one another, means for introducing compressed fluid into the outermost joint section, thereby extending the other two joint sections from the outer section, the outer and middle joint sections being thereby automatically interlocked together, and means for exhausting the said compressed fluid, thereby causing the innermost joint to telescope into the second joint and to release the said interlock, whereupon the outermost joint descends by gravity over the second joint and the middle joint is interlocked with the innermost joint when the jack is fully collapsed.

4. A multiple joint pneumatic jack, including in combination, a plurality of sleeve joints telescoping one into another, and means operative to automatically lock one joint to the next successive joint, the said automatic means comprising a piston reciprocative in an outer joint and attached to an inner joint, expansible means automatically operative to lock the two joints together at a predetermined point, and means for introducing and applying compressed fluid so as to be effective upon said piston to extend the successive sleeves relative to one another.

5. A multiple joint pneumatic jack, including in combination, a plurality of joint sleeves extensibly telescoped one into another, a bored piston reciprocative in one joint sleeve, an expansible ring disposed in an outer annular groove in the piston, another expansible ring disposed in an inner annular groove in the piston, radial pins extending between the two rings and adapted to communicate motion from one annular ring to the other, the ring in the inner annular groove when expanded, having an inside diameter at least equal to the diameter of the piston bore, a pilot knob reciprocative in the piston bore and adapted to be locked in a retracted position by the inner ring when contracted, and means whereby compressed fluid is caused to move the outer sleeves up relative to the piston.

6. A multiple joint pneumatic jack, including in combination, joint sections disposed to telescope one into another, a bored piston reciprocative in one joint section, an expansive ring housed in an outer annular groove in the piston, the said joint section and the expansible ring having cooperating beveled faces disposed to mutually interlock at a predetermined point of extension; mechanism operative to hold the sleeve and piston in the interlocked position, and actuating means attached to another of the said joint sections for the purpose of automatically releasing the interlock when that joint section is moving inwardly of its next adjacent joint section.

7. A multiple joint pneumatic jack, including in combination, a sleeve, a piston reciprocative therein, said piston having a bore therethrough and a counterbore, a pilot knob reciprocable in said bore, an expansible ring adapted to occupy said counterbore, and means operable to contract the expansible ring for the purpose of forming a stop abutment in the path of the pilot knob.

8. A multiple joint pneumatic jack, including in combination, a sleeve, a piston reciprocable therein, said piston having an axial bore and a counterbore, a pilot knob reciprocable in the said bore, an expansible ring adapted when expanded to occupy the counterbore so as to allow the pilot knob to pass through the expanded ring, and a second sleeve connected to the pilot knob and adapted to be drawn into the first-mentioned sleeve, the said expansible ring being adapted to contract so as to engage the said pilot knob and to prevent the second sleeve from being drawn out of the first sleeve.

9. A multiple joint pneumatic jack, including in combination, a sleeve, a head axially movable therein, the said head having a bore, an annular counterbore and an outer annular recess opposite the bore, an expansible ring housed in the outer annular recess, another expansible ring housed in the counterbore, the said sleeve joint having an annular recess into which the outer expansible ring is adapted to expand, thereby causing the inner ring to expand into the counterbore, and a retainer disposed to enter the inner ring when the latter is expanded.

10. A multiple joint pneumatic jack, according to claim 9 wherein the retainer is in the form of a cylindrical body having an annular flange at one end, and where the head is counterbored to form a limited runway for said flange as the retainer moves back and forth.

11. A multiple joint pneumatic jack, including in combination, a joint section, another joint section having a bored piston telescoping thereinto, an expansive ring housed in a counterbore of the piston, a third joint section having a pilot knob, the said expansive ring, contracted, serving to interlock with the pilot knob when the three joint sections are telescoped together, and means for releasing the pilot knob interlock at a predetermined point when the joint sections are extended.

12. A multiple joint pneumatic jack, including in combination, a joint section, another joint section having a bored piston, telescoping thereinto, a pair of expansive rings housed in annular grooves opposite, but spaced apart from each other in the body of the piston, the passage through the inner ring when expanded being at least equal in diameter to the diameter of the piston bore, a pilot knob reciprocable through the piston bore and the expanded ring passage, a retainer for the expanded ring reciprocable in a chamber of the cylinder above the inner ring, said retainer having a limit stop, a plug removably fixed in the piston above the said retainer, a stem projecting upwardly from the plug, a cup leather above the plug, and means attached to the plug stem to hold the cup leather in place.

ABBOTT G. ROBINSON.